May 10, 1927.
A. C. GRUNWALD
SHEAVE
Filed March 27, 1924
1,627,558
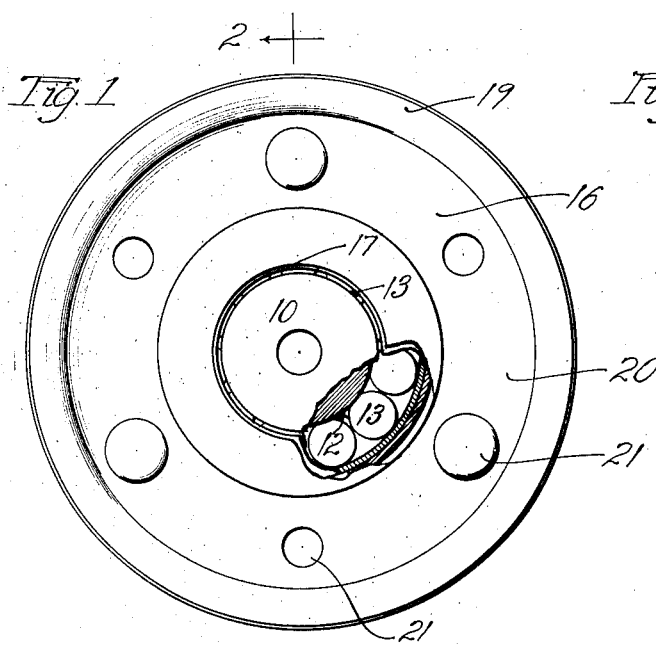
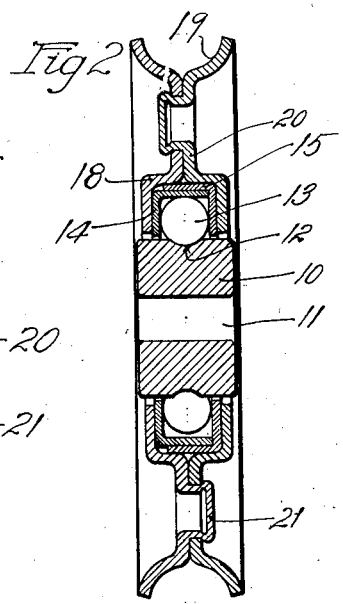
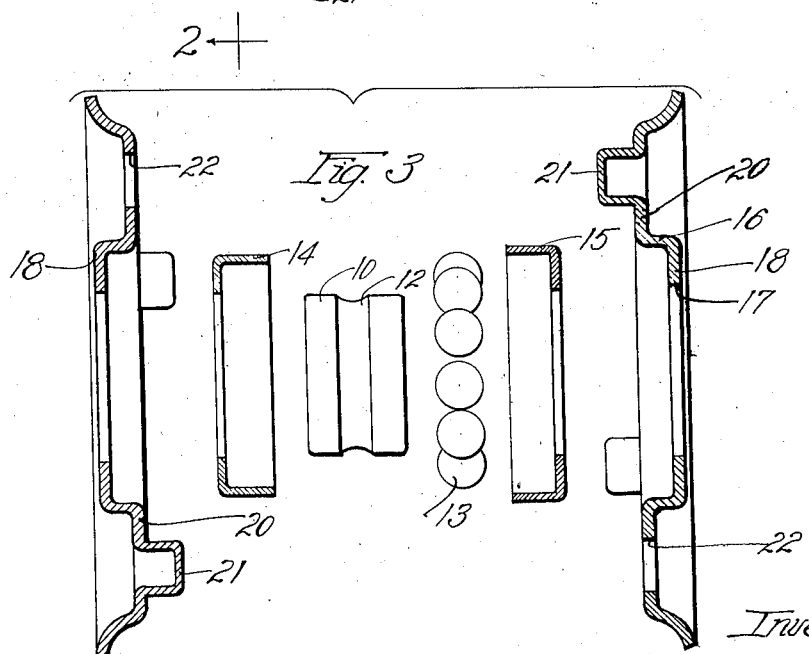
Inventor
Albert C. Grunwald
Williams, Bradbury
& McCaleb
Attys Patented May 10, 1927.

1,627,558

UNITED STATES PATENT OFFICE.

ALBERT C. GRUNWALD, OF RIVER FOREST, ILLINOIS, ASSIGNOR TO PRECISION METAL WORKERS, OF CHICAGO, ILLINOIS, A CORPORATION OF ILLINOIS.

SHEAVE.

Application filed March 27, 1924. Serial No. 702,277.

My invention relates to wheels or sheaves and more especially to those made from pressed metal parts and provided with antifriction bearings. Certain features of my invention are concerned particularly with means for riveting together the pressed metal halves of a split wheel, and with an improved construction of raceway for a ball bearing. These and other features and objects of my invention are set forth in the following description of a particular sheave which embodies my invention and is illustrated in the accompanying drawings, wherein—

Figure 1 is a side elevation of my sheave;

Figure 2 is a transverse section taken on the line 2—2 of Figure 1, and

Figure 3 is a transverse section of the several parts shown in axial alignment prior to assembly.

The ball bearing sheave here shown is mounted upon a central bearing member 10, circular in shape and provided with a bore 11 through which passes a suitable bolt or other pin to support the sheave in a pulley block. The periphery of the central bearing member 10 is provided with a shallow arcuate groove 12 in which is disposed an annular row of balls 13. The row of balls is confined in a rotary raceway formed by a pair of telescoping cup-shaped members 14 and 15. As shown in Figure 2, the annular flange of the member 15 is large enough to fit snugly about the annular flange of the member 14. The balls thus have contact with three surfaces of the rotary raceway, that is, with the lateral flange of each of the members 14 and 15 and with the annular flange of the member 14. The annular flange of the member 14, it will be noted, spaces its annular flange and that of the member 15 to provide a raceway of the correct width for the balls.

Each of a pair of similarly conformed circular plates or discs 16 constituting the halves of the split sheave is provided with a central aperture 17 for the protruding ends of the central bearing member 10, and adjacent the margins of the aperture with an outwardly pressed hub portion 18 for enveloping the respective sides of the cup-shaped members 14 and 15 to support them centrally of the wheel and hold them in assembled relation. The outer peripheries of the plates 16 are provided with outwardly pressed arcuate flanges 19 which co-operate to form the usual belt groove.

Between the hub portions 18 and the flanges 19 are left laterally juxtaposed annular web portions 20 by means of which the plates are secured together.

The web portion 20 of each plate is provided with a plurality (in the drawings, three) of cup-shaped bosses 21 struck inwardly from the plane of the webs, the bosses being equally spaced about the same radius. Intermediate the bosses 21, the web portion 20 of each plate is provided with a plurality of holes 22 of the same number as the bosses 21 and at the same radius from the center of the wheel but intermediate the bosses 21. It will be apparent that the plates 16 are identical and consequently may be formed by the same die.

The plates are brought into lateral juxtaposition, with the telescoped members 14 and 15 encased within the hub portions 18 of the plates, and the bosses 21 inserted in the mating holes 22. Subsequently to this the assembled sheave is placed in a press and the closed ends of the cup-shaped bosses 21 are flattened, deforming the ends thereof so that they overlie the margins of the holes 22 at the outer edges thereof. The plates 16 are thereby securely locked together at six points about the web portions 20, permanently securing the cup-shaped members 14 and 15 and the balls 13 in assembled relation and, by means of the groove 12, holding the central bearing member 10 against longitudinal movement relative to the sheave.

It is to be noted that in the riveting operation performed on the cup-shaped bosses 21, it is unnecessary accurately to place the assembled sheave in the press since the riveting may be performed by a flat surface for engaging the ends of the bosses. Were the bosses 21 open ended, it would be necessary to provide the press with a plurality of suitable protuberances for spreading the outer end of the boss or eyelet and to center the assembled sheave accurately upon those protuberances when placing it in the press. It is also to be observed that, in forming the sheave, after the several parts have been assembled, they may be held in such position by the bosses 21, which fit snugly into the mating holes 22, allowing the assembled sheave to be handled and carried about without danger of disassembling the sheave before it has been placed in the press or other riveting machine.

While I have described my invention as applied to this particular sheave, it is to be understood that it is equally applicable to other types of wheels and that changes may be made in the construction shown without departing from the spirit or scope of my invention. It is obvious also that without changing the construction herein shown, the groove 19 may be provided with a rubber tire and the central bearing member 10 be supported upon a caster pivot or other bracket when the device is to be used as a supporting wheel.

Having thus described my invention, what I claim as new and desire to secure by Letters Patent of the United States is:

A split wheel or sheave comprising a pair of similarly conformed plates, a hub and a rim for said wheel formed in said plates, said plates having laterally juxtaposed web portions between said hub and rim, the web portion of each plate being provided with a hollow boss having a closed end, said bosses being struck inwardly from said plates, and each plate being further provided with a hole therethrough, the boss on each plate extending through the hole in the other plate, and the outer closed end of each boss being deformed to overlie the other plate at the outer edges of the hole for holding the plates together.

In witness whereof, I hereunto subscribe my name this 22nd day of March, 1924.

ALBERT C. GRUNWALD.